United States Patent [19]

Kovac

[11] Patent Number: 5,135,089
[45] Date of Patent: Aug. 4, 1992

[54] TRANSMISSION CLUTCH FOR A MOTOR VEHICLE HAVING A DYNAMIC ABSORBER

[75] Inventor: Josip Kovac, Ozoir-La-Ferriere, France

[73] Assignee: Valeo, Cedex, France

[21] Appl. No.: 788,923

[22] Filed: Nov. 7, 1991

[30] Foreign Application Priority Data

Nov. 8, 1990 [FR] France .................................. 90 13862

[51] Int. Cl.$^5$ .................................................. F16D 3/14
[52] U.S. Cl. ............................... 192/70.17; 192/30 V; 192/106.2; 74/574; 464/68
[58] Field of Search ............... 192/70.17, 106.2, 30 V; 74/572, 574; 464/68

[56] References Cited

U.S. PATENT DOCUMENTS

| 4,729,464 | 3/1988 | Friedmann | 192/70.17 |
| 4,796,740 | 1/1989 | Fukushima | 192/30 V |
| 4,842,116 | 6/1989 | Fukushima | 192/106.2 |
| 4,842,117 | 6/1989 | Fukushima | 74/574 X |
| 4,856,639 | 8/1989 | Fukushima | 74/574 X |

FOREIGN PATENT DOCUMENTS

| 2616184 | 12/1988 | France | 192/30 V |
| 2128272 | 4/1984 | United Kingdom | 192/70.17 |

Primary Examiner—Rodney H. Bonck
Assistant Examiner—Andrea Pitts
Attorney, Agent, or Firm—Longacre & White

[57] ABSTRACT

A transmission clutch, for releasably coupling a driven shaft to a driving shaft, comprises a driving part and a driven part, with the driving part including a reaction plate and the driven part including a hub which is fixed to the driven shaft for rotation with the latter. The clutch includes a dynamic absorber associated with the hub and carried by the pressure plate.

The dynamic absorber comprises an input part carried by the inner periphery of the pressure plate, with a bearing being interposed between this input part and the inner periphery of the pressure plate. The absorber also has an output part and a disengageable rotatable coupling between the output part and the hub. This coupling couples the output part of the dynamic absorber rotatably with the hub when the clutch is engaged.

10 Claims, 3 Drawing Sheets

TRANSMISSION CLUTCH FOR A MOTOR VEHICLE HAVING A DYNAMIC ABSORBER

FIELD OF THE INVENTION

The present invention relates to transmission clutches, in particular for motor vehicles, comprising a driving part adapted to be coupled in rotation to a driving shaft, together with a driven part which is adapted to be coupled in rotation to a driven shaft, with the said driving part comprising a reaction plate and a pressure plate, the pressure plate being, firstly, movable axially with respect to the reaction plate while being coupled in rotation to the latter, and secondly, subjected to the action of first resilient means bearing on a cover member which is fixed with respect to the reaction plate, while the driven part of the clutch comprises a friction pad support member carrying friction liner means adapted to be gripped between the said reaction plate and pressure plate for transmission of rotary motion from the driving shaft to the driven shaft, the friction pad support member being coupled to a hub which is fixed to the driven shaft for rotation with the latter, and the clutch further including a dynamic vibration damper, which is carried at least partly by the said driving part in association with the hub, the dynamic vibration damper comprising two coaxial parts which are mounted for movement with respect to each other against the action of circumferentially acting second resilient means.

BACKGROUND OF THE INVENTION

Such a dynamic vibration damper (more commonly referred to as a dynamic absorber) is described in the specification of United states patent No. 4 842 116. Its dimensions are so chosen that it acts to absorb vibrations in a frequency range around the resonant frequency of the system in which the clutch is fitted. In the above mentioned United states patent specification, the dynamic absorber is attached to the hub, and includes a secondary plate which is mounted coaxially through a bearing on the reaction plate, so as to be rotatable with respect to the latter. The dynamic absorber further includes a radial support plate which is also attached to the hub, and which carries a friction liner that is arranged to cooperate with the secondary plate. In addition, in order to improve damping still further, circumferentially acting resilient means are arranged to act between the reaction plate and the secondary plate. All of this has the effect of complicating the manufacture of the reaction plate of the clutch, and increases the number of components of the clutch.

DISCUSSION OF THE INVENTION

An object of the present invention is to overcome the above mentioned disadvantage, and to provide a clutch having a novel dynamic absorber which is simple and cost-effective and which is carried by the driving part of the clutch; a further object is to simplify the reaction plate.

In accordance with the present invention, a clutch of the kind defined under the heading "Field of the Invention" above is characterised in that the dynamic vibration damper (dynamic absorber) is carried by the pressure plate and includes, firstly, an input part carried by the inner periphery of the pressure plate, with a bearing being interposed between the said input part and the inner periphery of the said pressure plate, and secondly an output part, with disengageable rotary coupling means being interposed between the said output part and the hub for coupling the output part in rotation with the hub when the clutch is engaged.

In a clutch according to the invention, the reaction plate can be of a standard type, which is therefore appropriate for clutches whether or not they are provided with dynamic absorbers. It will be appreciated that the pressure plate may itself also be used for clutches whether or not they have dynamic absorbers. The dynamic absorber is preferably mounted within the pressure plate, so that the available space within the clutch assembly is used to the best advantage.

The description of preferred embodiments of the invention that follows, is given by way of example only and with reference to the accompanying drawings.

DESCRIPTION OF PREFERRED EMBODIMENTS OF THE INVENTION

Figure 1:
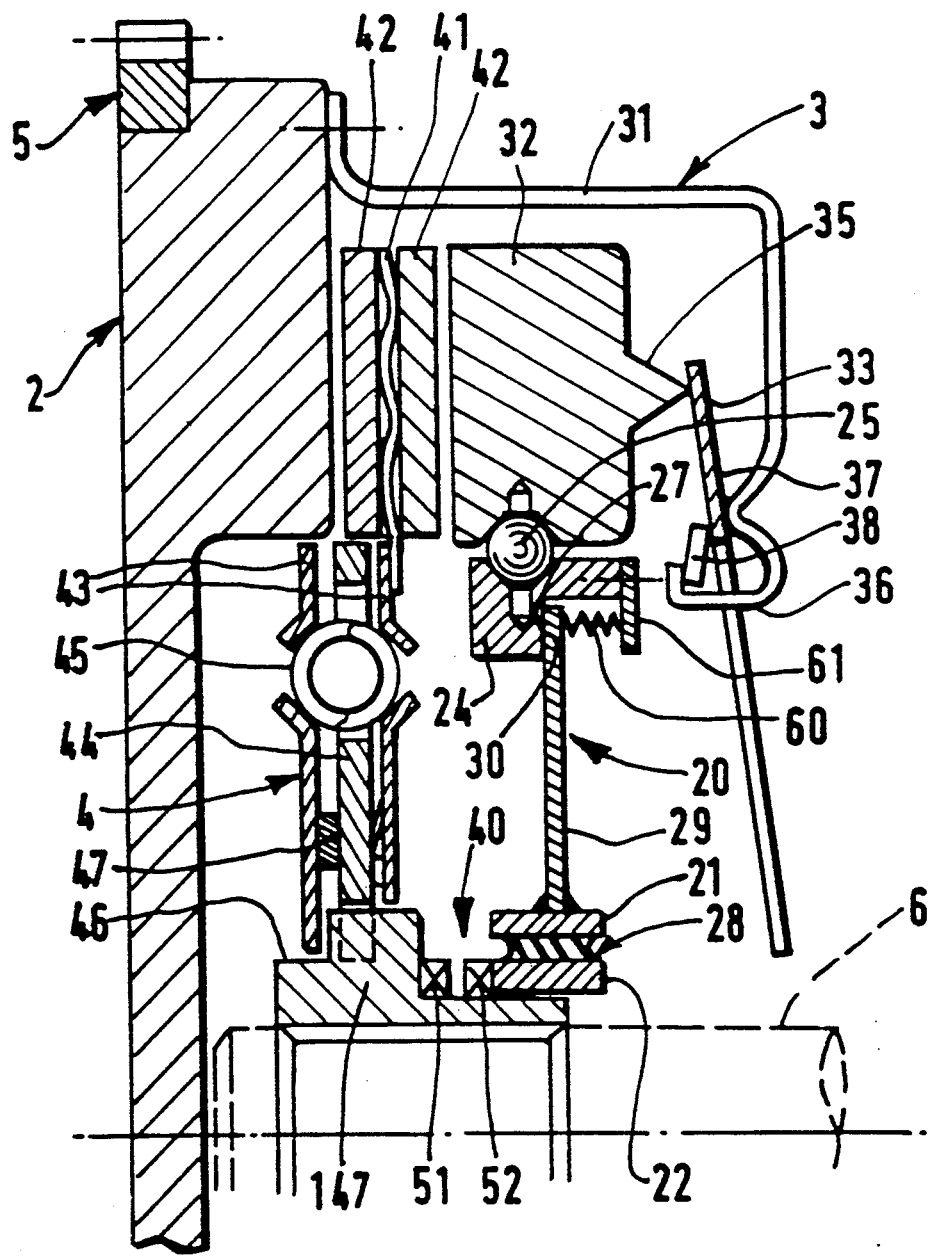
FIG. 1 is a view in axial cross section showing one half of the clutch in one form in accordance with the invention.
Figure 2:
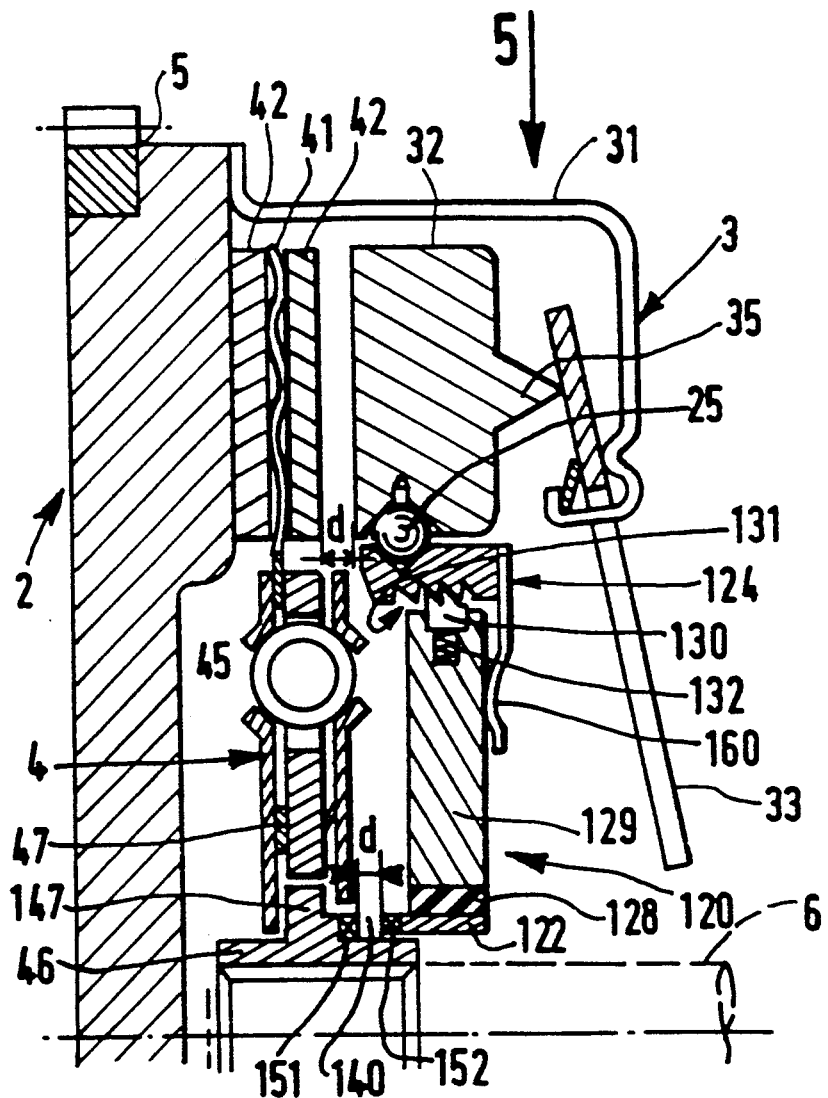
FIG. 2 is a view similar to FIG. 1, showing a second embodiment of the invention.
Figure 3:
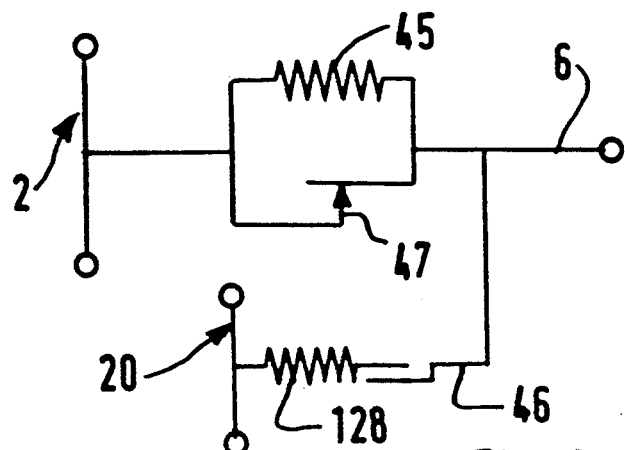
FIG. 3 is a diagram illustrating the operation of the clutch shown in FIG. 2.

In the embodiments shown in FIGS. 1 and 2 the transmission clutch, for a motor vehicle having an internal combustion engine, which is shown in those Figures comprises a driving part 2, 3 which is coupled in rotation to the crankshaft 1 of the engine, the latter thus constituting a driving shaft. The clutch also includes a driven part 4 which is coupled in rotation to a driven shaft 6, which in this example consists of the input shaft of the gearbox. The driving part of the clutch includes a reaction plate 2 and a clutch mechanism 3. The clutch mechanism 3 comprises a cover member 31, a pressure plate 32 and a diaphragm 33, all these components being annular in shape. The cover member 31 is in the form of a hollow plate having a radial flange for securing the clutch mechanism to the reaction plate 2, together with a peripheral skirt which joins the securing flange to a base portion of the cover member. The base portion is open at its centre.

Figure 5:
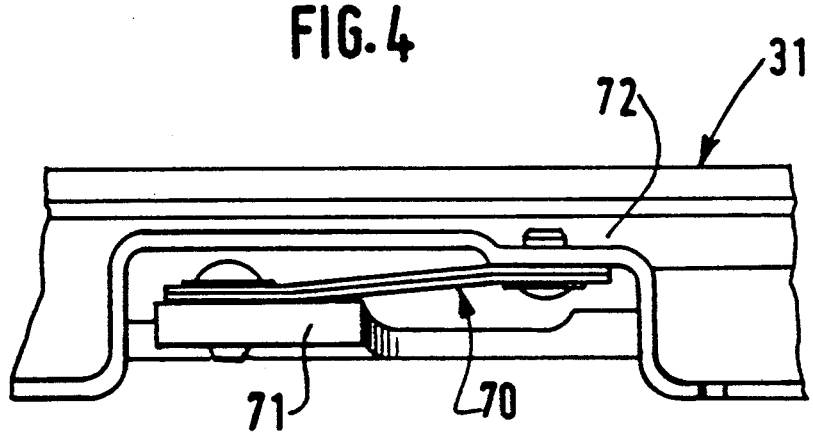
FIG. 5 a scrap view as seen in the direction of the arrow 5 in FIG. 1.

The pressure plate 32 is mounted for axial movement with respect to the cover member 31, to which it is coupled in rotation, for example by a tenon and mortice type coupling. In such a coupling, the reaction plate has tenons which are engaged in recesses formed in the skirt portion of the cover member 31. In a modification of that arrangement, shown in FIG. 5, this coupling is effected by means of tangential tongues 70, which extend in known manner from a radial lug 71 of the pressure plate to a fastening zone 72 which is part of the fastening flange of the cover member, the skirt portion of the latter being slotted to permit the lugs 71 to pass through.

In this example the diaphragm 33 is mounted for tilting movement on the cover member 31, in order to bias the pressure plate 32 towards the reaction plate 2. This tilting mounting is effected by means of lugs 36, which project from the base portion of the cover member 31 and which pass axially through apertures formed in the diaphragm 33. The lugs 36 are bent radially outwardly, away from the axis of the assembly, at their free ends in order to retain around the lugs 36 a crown 38 which serves as a secondary engagement surface for the diaphragm 33. The crown 38 is arranged facing a primary engagement surface 37 which is carried by the base portion of the cover member 31, and which in this example is in the form of a pressed-in bead.

More precisely, the diaphragm 33 bears through the inner periphery of its Belleville ring portion on the primary engagement surface 37, and through the outer periphery of its Belleville ring portion on an interrupted annular rib 35 formed on the pressure plate 32.

The driven part of the clutch comprises a friction pad support plate 41, carrying friction liner means in the form of an annular friction liner 42, which may be in the form of a plurality of separate pads and which are adapted to be gripped between the pressure plate 32 and the reaction plate 2, in order to transmit the rotary motion of the driving shaft to the driven shaft 6. The friction pads 42 extend on either side of the friction pad support plate 41, to which they are secured. The support plate 41 is resiliently deformable, in order to give progressive gripping of the friction pads 42. In this example, the plate 41 is corrugated for this purpose. It is coupled to a hub 46, which is secured to the input shaft 6 of the gearbox for rotation with it. The hub 46 has a splined internal bore for sliding along the input shaft 6, the latter being correspondingly splined.

Figure 6:
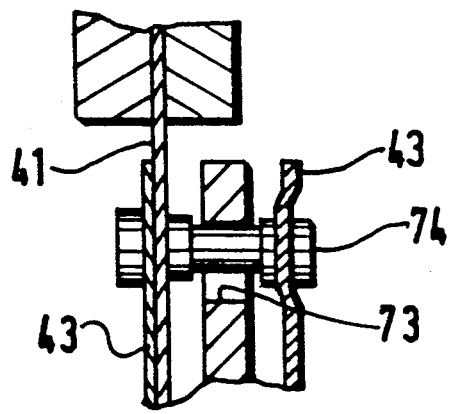
FIG. 6 is a scrap view showing a spacer of the torsion damper.

In this embodiment, the support plate 41 is coupled to the hub 46 through a torsion damper. This damper comprises two guide rings 43 which are arranged on either side of a damper plate 44, these guide rings 43 being joined together by means of axial spacers 74 (see FIG. 6), which extend through slots 73 formed for this purpose in the damper plate 44. The friction pad support plate 41 is secured to one of the guide rings 43. These latter are formed with formed in the damper plate 44. Circumferentially acting first resilient means 45, which here are in the form of coil springs, are mounted in these windows so as to act between the damper plate 44 and the guide rings 43.

Friction means 47 also act between the damper plate 44 and the guide rings 43. These friction means 47 are of a known form comprising at least one friction ring which is interposed axially between one of the guide rings 43 and the damper plate 44, together with an axially acting resilient means which bears on the other guide ring 43 so as to urge the damper plate 44 towards this friction ring, whereby to grip it.

Figure 4:
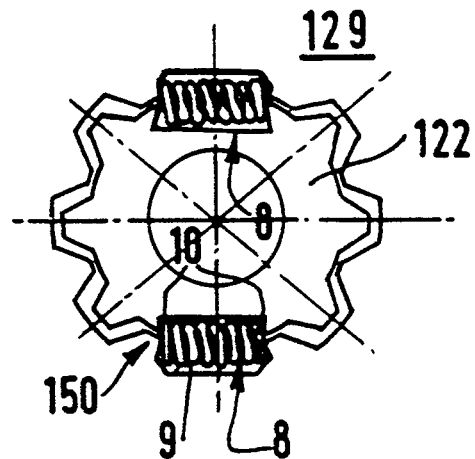
FIG. 4 is a view in elevation showing part of the clutch mechanism with one embodiment of circumferentially acting resilient means acting between the input part and the output part of the dynamic vibration damper.

In this example, the damper plate 44 is mounted on the hub 46 through loose coupling means which are here in the form of teeth (as can be seen in FIG. 4), for coupling the damper plate 44 with the hub with some circumferential play. More precisely, and as seen in FIG. 4, the damper plate 44 and the hub 46 are each provided with teeth which penetrate, with circumferential clearance, into slots formed in the other component 46 or 44 and defined between its teeth. Further slots are formed so as to interrupt the sets of teeth in order to accommodate resilient means having a lower stiffness than the springs 45. These resilient means, here in the form of springs, bear against the base of their housing slots through thrust insert blocks 10. Thus, in a first stage of operation of the clutch, the damper plate 44 is displaced against these low stiffness springs. After the clearances in the loose coupling means have been taken up, the guide rings 43 become displaced with respect to the damper plate 44, against the action of the springs 45, the damper plate 44 then being coupled fully in rotation to the hub 46. The damper plate 44 may of course be fixed to the hub 46, by being mounted on the latter by a gripping fastening.

The reaction plate 2 is carried on the crankshaft 1 by means of fasteners such as screws, not shown. It is adapted to cooperate frictionally with the friction pads 42.

The reaction plate 2 carries the starter crown 5 which cooperates with the starter motor, not shown, of the motor vehicle. The reaction plate also carries the cover member 31, to which it is fastened through the securing flange of the latter, for example by threaded fasteners such as studs.

The clutch also includes a dynamic vibration damper or dynamic absorber 20, which is carried at least partly by the driving part 2, 3 and is associated with the hub 46. This dynamic absorber is in two coaxial parts, which are mounted for movement of one with respect to the other against the action of circumferentially acting second resilient means 8, 28.

The dynamic absorber 20 shown in FIG. 1 is carried by the pressure plate 32. Its two relatively movable parts comprise an input part 24, 21, 29, and an output part 22. The input part is carried by the inner periphery of the pressure plate, with a support bearing 25 being interposed between the latter and the input part of the dynamic absorber. A disengageable rotary coupling means 40 is interposed between the output part 22 and the hub 46, for coupling them together in rotation when the clutch is engaged.

In FIG. 1, the input part of the dynamic absorber comprises a secondary plate 24, a radial support plate 29, and a sleeve 21, all these components being annular in shape. The secondary plate 24 has a groove of V-shaped cross section at its outer periphery, aligned with a corresponding V-shaped groove formed in the inner periphery of the pressure plate 32. A set of balls is mounted between these complementary grooves, so as to constitute, with these grooves, the support bearing 25. The latter, in the embodiment shown in FIG. 1, is thus disposed between the outer periphery of the input part of the dynamic absorber and the inner periphery of the pressure plate. In a modification, not shown, this bearing may instead consist of a ring of a suitable antifriction material, interposed between the outer periphery of the secondary plate 24 and the inner periphery of the pressure plate 32. In a further modification, not shown, the bearing may be in the form of a ball bearing having one or more ball races.

The radial support plate 29 is fixed to the sleeve 21, for example by welding as shown in FIG. 1, though it may for example be force-fitted into the sleeve 21. The subassembly consisting of the radial support plate 29 and the sleeve 21 is connected to the secondary plate 24 through a friction device, and is mounted coaxially with respect to the secondary plate 24. For this purpose, the latter has an annular friction surface 30, for engagement with the outer periphery of the radial support plate 29. The secondary plate 24 carries a flat ring 61, which is secured to the plate 24 by means of screws, not shown.

A spring 60 (in this example a coil spring) bears on the ring 61 so as to bias the radial support plate 29 towards the secondary plate 24, thus bringing the friction surface 27 of the former into engagement with the friction surface 30 of the latter. In general terms, the spring 60 is merely one example of an axially acting third resilient means, which may alternatively be in the form of a Belleville ring or of a corrugated ring of the kind known by the Trade Mark ONDUFLEX.

The radial support plate 29 may of course carry at its outer periphery, on the surface of the support plate which faces away from the flat ring 61, a friction pad for indirect contact with the friction surface 30 of the secondary plate 24.

A resiliently calibrated friction coupling is thus provided for coupling together the two elements of the input part of the dynamic absorber that consist of the secondary plate 24 and the components 29 and 21, respectively.

The output part 22 of the absorber 20 is in the form of a sleeve surrounded by the sleeve 21, with an annular block 28 of resilient material arranged between, and fixed to, the sleeves 21 and 22. This block 28 may be secured adhesively, either with the use of an adhesive or for example by in situ vulcanisation. The dynamic absorber 20 thus comprises a first coaxial part 24, 61, 60, 29, 21, which is mounted on a second coaxial part 22 of the absorber, with a facility for limited movement of one part with respect to the other against the action of the circumferentially acting resilient means comprising the block 28.

The sleeve 22 surrounds the hub 46, and has axial teeth 52 at its axial end facing towards a flange 147 of the hub 46. This flange 147 has a further set of teeth 51, complementary to the teeth 52 and disposed on the radial surface of the flange 147 that faces towards the pressure plate 32. Accordingly it will be realised that the teeth 51 and 52 together form two complementary comb-like elements, with the teeth 52 penetrating into the recesses between the teeth 51 and the teeth 51 penetrating into the recesses separating the teeth 52. Thus, by meshing of the teeth 52 in the complementary recesses in the flange 147, and by meshing of the teeth 51 in the complementary recesses of the sleeve 22, a disengageable rotary coupling 40 is formed between the output part of the dynamic absorber 20 and the hub 26 of the driven part of the clutch, and this coupling is engaged when the clutch is engaged. When the clutch is disengaged, the teeth of the two sets 51 and 52 are out of engagement with the recesses defined in the other set of teeth.

The apparatus operates in the following way. When the clutch is engaged, the friction pads 42 are gripped between the reaction plate 2 and the pressure plate 32, and motion is transmitted from the driving shaft to the driven shaft 6, with the friction surface 27 of the radial support plate 29 being in frictional contact with the frictional surface 30 of the secondary plate 24, being forced axially into contact with the latter by the spring 60. The dynamic absorber is thereby brought into commission. When the clutch is disengaged, the friction pads 42 are released, with an axial clearance then existing between the latter and the reaction and pressure plates 2 and 32 respectively.

It will be remembered that normally, the clutch in engaged under the action of the diaphragm 33, and that in order to disengage the latter it is merely necessary to actuate a clutch release bearing, so that the latter exerts an axial thrust on the radially inner ends of the fingers of the diaphragm, such that the diaphragm then pivots between the two engagement surfaces 37 and 38.

Because the dynamic absorber 20 operates when the clutch is engaged, the gearbox is only subjected to the effect of a very small inertia when the clutch is disengaged. This is of advantage particularly during a rapid shift of the gears of the gearbox. It will also be appreciated that the radial support plate 29, as well as the sleeves 21 and 22, follow the movement of the pressure plate 32, which is displaced when the clutch changes from its engaged condition to its disengaged condition.

The dimensions of the dynamic absorber are suitably chosen for the particular application to which the clutch is to be put, and in particular in accordance with the dynamic characteristics of the engine of the vehicle, and the vibrations generated by the engine. The dynamic absorber is designed to operate in a frequency range around the resonant frequency when the clutch is engaged, so as to suppress these vibrations in the usual manner that is well known for dynamic absorbers. The dimensions of the plate 24, and more particularly its mass, are chosen accordingly. Again, it will be appreciated that this apparatus is very compact, and that the block 28 of resilient material also has a damping function. This block may if desired by in the form of a plurality of separate members, and may for example be of an elastomeric material such as a rubber.

Referring now to FIG. 2, certain components in this modified embodiment of the invention are indicated by the same reference numerals as in FIG. 1, with some of them having 100 added. In FIG. 2, the input part of the dynamic absorber 20 comprises two elements 124 and 129 which are displaceable axially with respect to each other, and which are coupled together through a wear compensating coupling. More precisely, the secondary plate 124 is carried, as in the embodiment of FIG. 1, by the inner periphery of the pressure plate 32, with a bearing 25, of the same kind comprising balls seated in complementary grooves, interposed. However, in FIG. 2 the secondary plate 124 has a set of teeth 131 formed on its inner periphery. These teeth are of sawtooth profile, of the type having a vertical portion and an inclined portion adapted to cooperate with toothed pawls 130. The teeth of the latter are arranged to cooperate in a complementary manner with the teeth 131. Each pawl 130 is carried on the outer periphery of an inertia mass comprising the radial support plate 129, from which it projects radially outwardly.

The pawl is movable radially on the inertia mass 129, and is biassed radially outwardly by a spring 132 housed in a radial groove in the inertia mass 129. A further spring 160, which is fixed to the secondary plate 124, bears on the inertia mass 129, so as to urge the teeth of the paw 130 into engagement with the teeth 131, in particular when the clutch is disengaged. The inertia mass 129 is, as before, fixed to a block 128 of resilient material, which is itself fixed to a sleeve 122 that constitutes the output part of the dynamic absorber 20. The sleeve 122 lies radially within the annular inertia mass 129, and is formed with teeth 152 which lie in register with teeth 151 carried by the hub 46 in the same way as described above with reference to FIG. 1. Thus, again as in FIG. 1, the sets of teeth 151 and 152, or cooperating combs, are again so arranged as to provide a disengageable rotary coupling, 140.

Thus, when the clutch is disengaged, a distance d exists between the friction pad 42 concerned and the pressure plate 32, and the same distance d exists between the teeth 151 and the teeth 152. When the clutch is engaged, the wear compensating coupling described above comes into operation, with the pawl 130 retracting radially inwards against the action of the spring 132 in order to pass from engagement with one tooth of the secondary plate 124 into engagement with another of these teeth. In this way the reduction in thickness of the friction pads 42 due to wear is compensated for. It should be noted that, to this end, the vertical part of the teeth 131 faces towards the cover member 31.

It will be appreciated that in every case, the dynamic absorber 20 is mounted within the pressure plate 32, parallel to the torsion damper 4, and that the rotational coupling between the output part 22 or 122 of the dynamic absorber is disengageable, with the dynamic absorber following the movement of the pressure plate 32.

The rotary coupling between the hub 46 and the output part 22 or 122 of the dynamic absorber may of course take any suitable form, besides that described above. For example, it may comprise a set of dowels carried by the output part of the dynamic absorber and engaging with holes or mortices formed in the hub 46. In a further modification which is shown in FIG. 4, the block 28 or 128 of resilient material is replaced by coil springs 8 interposed between the output part 122 of the dynamic absorber 20 and the inertia mass 129. In this connection, each spring 8 is housed between two slots 9. The latter are formed in the outer periphery of the sleeve 122 and the inner periphery of the inertia mass or support plate 129, respectively. Each end of each spring 8 bears on the ends of the corresponding slots 9 through thrust insert blocks 10 of dihedral profile.

The slots 9 interrupt two cooperating sets of teeth 150 which constitute a loose coupling means of a known type between the inertia mass 129 and the sleeve 122. This loose coupling means comprises the set of teeth formed on the sleeve 122 and penetrating, with a circumferential clearance, into the slots defined between the set of teeth of the inertia mass, and vice versa.

In the embodiments shown in the drawings, the clutch is of the "push to disengage" type, in which an axial thrust is exerted on the diaphragm by the clutch release bearing or equivalent. The clutch may however equally well be of the "pull to disengage" type, in which case the diaphragm 33 then bears, through the outer periphery of its Belleville ring portion, on the cover member 31, and through the inner periphery of its Belleville ring portion on the pressure plate 32, with the clutch being disengaged by exerting tractive force on the diaphragm. Similarly, in place of a diaphragm, a plurality of helical springs may be used in combination with declutching levers.

What is claimed is:

1. A transmission clutch for the releasable rotational coupling of a driving shaft to a driven shaft, the clutch comprising a driving part for securing to a said driving shaft and a driven part for securing to a said driven shaft, the driving part of the clutch comprising a reaction plate, a cover member, means securing the cover member to the reaction plate, a pressure plate, means mounting the pressure plate for rotation with the reaction plate but for axial movement with respect to the latter, and first resilient means operatively disposed between the said cover member and the pressure plate, so as to bear on the cover plate and urge the pressure plate towards the reaction plate, the driven part of the clutch comprising a hub adapted to be secured to a said driven shaft, a friction pad support member, friction liner means carried by the friction pad support member to be gripped between the pressure plate and reaction plate whereby rotary notion can be transmitted from a said driving shaft to a said driven shaft, and means attaching the said friction pad support plate to the hub, wherein the clutch further includes a dynamic vibration damper associated with the hub and carried by the pressure plate so as to be carried at least partly by the driving part of the clutch, wherein the dynamic vibration damper comprises an input part, an output part coaxial with the input part, and circumferentially acting second resilient means operatively disposed between the said output and input parts, whereby the output and input parts are mounted for limited relative movement with respect to each other against the action of the said second resilient means, with the said input part being carried by the inner periphery of the pressure plate, and wherein the clutch further comprises a bearing arranged between the said input part of the vibration damper and the inner periphery of the pressure plate, together with disengageable rotary coupling means arranged between the said output part of the dynamic vibration damper and the hub, whereby to couple the said output part with the hub for rotation therewith when the clutch is engaged.

2. A clutch according to claim 1, wherein the said input part of the dynamic vibration damper comprises a first element, a second element, and a resiliently calibrated friction coupling means coupling the said first and second elements together.

3. A clutch according to claim 2, wherein the said first element is a secondary plate and the second element is a radial support member, the secondary plate having a friction surface for engagement with the said radial support member, the said input part further comprising an end thrust member carried by the secondary plate, and an axially acting third resilient means bearing on the end thrust member and on the radial support member whereby to bias the latter towards the said friction surface of the secondary plate.

4. A clutch according to claim 3, further including a first sleeve secured to the inner periphery of the radial support member.

5. A clutch according to claim 4, wherein the said second resilient means comprises a block of resilient material secured to the said first sleeve, the said output part of the dynamic vibration damper comprising a second sleeve, with the said block being secured to the second sleeve and interposed radially between the said first and second sleeves.

6. A clutch according to claim 1, wherein the said input part of the dynamic vibration damper comprises a first element, a second element, means mounting the said first and second elements for axial displacement of one of them with respect to the other, and a wear compensating coupling means interposed between the said first and second elements.

7. A clutch according to claim 6, wherein the said first element is a secondary plate having internal teeth, the said second element being an inertia mass, the wear compensating coupling means comprising the said teeth and a pawl carried by the said inertia mass and cooperating with the said teeth.

8. A clutch according to claim 7, wherein the output part of the dynamic vibration damper comprises a sleeve, the said second resilient means of the dynamic vibration damper consisting of a block of resilient material secured to the inner periphery of the said inertia mass and to the said sleeve.

9. A clutch according to claim 1, wherein the hub has a radial flange, the said disengageable rotatable coupling means between the hub and the said output part of the dynamic vibration damper comprising a first set of teeth carried by the said hub flange and a second set of teeth carried by the said output part, with the teeth of each set defining recesses between adjacent teeth for mutual engagement of the teeth of each set in the recesses defined by the other set.

10. A clutch according to claim 1, wherein the dynamic vibration damper extends radially within the pressure plate.

* * * * *